United States Patent [19]

Maeda et al.

[11] Patent Number: 4,953,423
[45] Date of Patent: Sep. 4, 1990

[54] STEERING WHEEL WITH SHOCK ABSORBER

[75] Inventors: Kouzo Maeda, Yokohama; Masanobu Yoshioka; Makoto Hikone, both of Yokosuka, all of Japan

[73] Assignee: Nissan Motor Co., Ltd., Yokohama, Japan

[21] Appl. No.: 363,186

[22] Filed: Jun. 8, 1989

[30] Foreign Application Priority Data

Jun. 9, 1988 [JP] Japan .............................. 63-76818[U]
Feb. 28, 1989 [JP] Japan ..................................... 148754
Mar. 10, 1989 [JP] Japan ..................................... 159279

[51] Int. Cl.⁵ .............................................. B62D 1/11
[52] U.S. Cl. ...................................... 74/552; 74/553; 74/551.2; 280/750; 280/777
[58] Field of Search ............... 74/552, 553, 548, 551.2; 280/777

[56] References Cited

U.S. PATENT DOCUMENTS 4,660,852  4/1987  Katayama et al. ..................... 74/552

FOREIGN PATENT DOCUMENTS 3426684   7/1983  Fed. Rep. of Germany ........ 74/552
0014573   1/1984  Japan ..................................... 74/552
61-103276 7/1986  Japan ..................................... 74/552
0210164   9/1987  Japan ..................................... 74/552

Primary Examiner—Leslie A. Braun
Assistant Examiner—Winnie Yip
Attorney, Agent, or Firm—Foley & Lardner, Schwartz, Jeffery, Schwaab, Mack, Blumenthal & Evans

[57] ABSTRACT

To effectively absorb shocks applied to both a rim and a cover pad of a steering wheel simultaneously or separately in spite of a simple construction, the steering wheel comprises a shock absorbing member disposed under the cover pad and sandwiched between upper and lower plates, and a spoke fixing plate for connecting radially inner ends of spokes to a middle peripheral surface of the shock absorbing member. A shock applied to the rim is mainly absorbed by the lower portion of the absorbing member by shearing deformation thereof and a shock applied to the cover pad is mainly absorbed by the upper portion of the absorbing member by compressive deformation thereof. Further, to uniformly absorb shocks applied to the cover pad at various points and in different directions, a support base having a projection is disposed under the lower plate (on which the shock absorbing member is arranged) to reduce the rigidity of the shock absorbing member. Furthermore, it is preferable to connect an additional W-shaped cross-section shock absorbing plate to a hollow cylindrical shock absorbing member via upper and lower plates for providing further uniform shock absorbing characteristics irrespective of points and directions at and in which a shock is applied.

26 Claims, 16 Drawing Sheets

PROIR ART (SUPPORT BASE)

F I G.12A
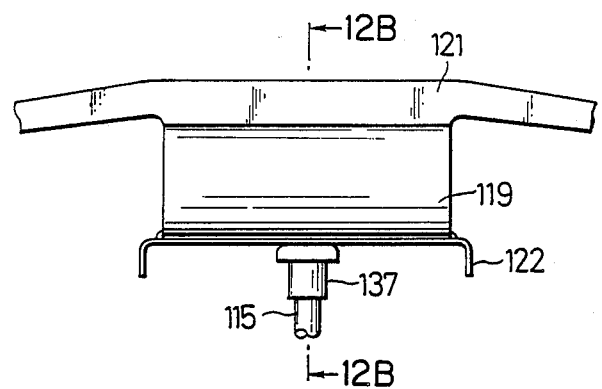
F I G.12B
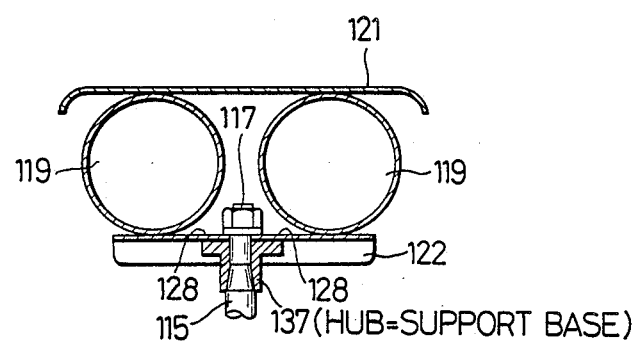

F I G.18
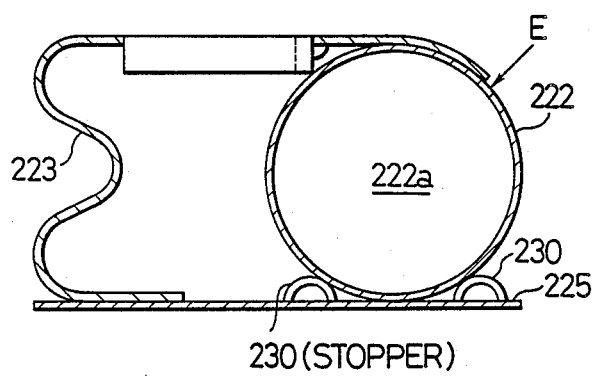

STEERING WHEEL WITH SHOCK ABSORBER

BACKGROUND OF THE INVENTION

1. Field of the Invention

The present invention relates to a steering wheel provided with a shock absorber, and more specifically to a steering wheel provided with uniform shock absorbing characteristics irrespective of points and directions at and in which a shock is applied.

2. Description of the Prior Art

FIGS. 1A and 1B show a prior-art steering wheel provided with a shock absorber by way of example, which is disclosed in Japanese Published Unexamined (Kokai) Utility Model Application No. 61-103276. This prior-art steering wheel 1 comprises a hub 2 attached to a steering shaft 3, at least one spoke 4 extending from the hub 2, a rim 5 supported by the spoke 4, and a cover pad 6 attached to the upper surface of the hub 2, as shown in FIG. 1A. Further, as shown in FIG. 1B, a shock absorber is provided between the hub 2 and the cover pad 6, which comprises a lower (hub side) plate 8 formed with a rectangular opening 8a and attached to the upper surface of the hub 2, an upper (cover side) plate 10 formed with a rectangular opening 10a and attached to the lower surface of the cover pad 6, and a cylindrical hollow shock absorbing member 11 (made of metal or hard rubber, for instance) sandwiched between the two plates 8 and 10 by partially fitting the outer circumferential surface of the cylindrical shock absorbing member 11 to the two rectangular openings 8a and 10a, respectively.

In this prior-art steering wheel 1, when a shock is applied to the cover pad 6, since the shock absorbing member 11 is deformed or crushed between the two plates 8 and 10, it is possible to absorb a shock energy applied to the cover pad 6.

In this prior-art steering wheel provided with a shock absorber, however, there exists a problem in that it is impossible to absorb a shock applied to the rim 5 by the deformation or the crush of the shock absorbing member 11. Therefore, in the prior-art steering wheel as shown in FIGS. 1A and 1B, it has been necessary to provide another shock absorbing member between the hub 2 and the spoke 4, thus resulting in another problem in that the number of parts is large and therefore the assembly steps and the manufacturing cost also increase.

Further, in the prior-art steering wheel as shown in FIGS. 1A and 1B, since the shock absorbing member 11 is supported by the two upper and lower plates 10 and 8 in such a way that the outer circumferential surface of the absorbing member 11 is brought into contact with the rectangular opening 8a or 10a at four different corners or along the two longitudinal cutout lines and further the length of the opening 8a or 10a is relatively long, there exists a problem in that the shock absorbing characteristics or the rigidity of the shock absorbing member 11 is subjected to the influence of points and directions at and in which a shock is applied to the absorbing member 11. This is because the deformation or crush shapes of the absorbing member 11 are different according to points and directions at and in which a shock is applied. For instance, the shock absorbing member 11 is crushed at a corner, along the radial and/or axial direction or in the directions obliquely to the radial and/or axial direction according to various shocks applied to the cover pad 6 at various points and in different directions.

Further, in the prior-art steering wheel as shown in FIGS. 1A and 1B, since the shape of the shock absorbing member 11 is simply cylindrical, it has been difficult to obtain uniform shock absorbing characteristics irrespective of points and directions at and in which a shock is applied.

SUMMARY OF THE INVENTION

With these problems in mind, therefore, it is the primary object of the present invention to provide a steering wheel provided with a shock absorber which can effectively absorb shock applied to the rim as well as the cover pad in spite of a simple construction.

To achieve the above-mentioned object, the steering wheel provided with a shock absorber according to the present invention comprises: (a) a steering wheel including a rim, a cover pad, and at least one spoke extending from said rim to under said cover pad; (b) shock absorbing means disposed under said cover pad; and (c) connecting means for connecting a radially inner end of said spoke to a roughly middle peripheral surface of said shock absorbing means so as to divide said shock absorbing means into a lower shock absorbing portion for mainly absorbing a shock applied to said rim in dependence upon shearing deformation thereof and an upper shock absorbing portion for mainly absorbing a shock applied to said cover pad in dependence upon compressive deformation thereof.

The rigidity of the lower shock absorbing portion is preferably determined lower than that of the upper shock absorbing portion to effectively absorb a shock applied to the rim.

The shock absorbing means is a twin oval or gourd-shaped cross-section hollow cylindrical member made of a hard rubber or a metal. The connecting means is a spoke fixing plate formed with an inner hollow portion through which the shock absorbing means is passed. The middle outer peripheral surface of the shock absorbing means is fixed to the inner hollow portion of the spoke fixing plate and the spoke is fixed to the spoke fixing plate from outside.

In the steering wheel according to the present invention, a shock applied to the rim when the driver strikes his breast against the rim in collision can be effectively absorbed by the lower portion of the shock absorbing member in dependence upon shearing deformation thereof, and a shock applied to the cover pad when the driver strikes his head against the cover pad can be effectively absorbed by the upper portion of the shock absorbing member in dependence upon compressive deformation thereof. Since two shocks can be absorbed by a single absorbing member, it is possible to simplify the construction of shock absorber for the steering wheel.

Another object of the present invention is to provide a steering wheel provided with a shock absorber having a relatively constant or uniform shock absorbing characteristics or rigidity irrespective of points and directions at and in which a shock is applied.

To achieve the above-mentioned object, a support base having a projection is disposed under the lower plate (on which the shock absorbing means is arranged) to reduce the rigidity of the shock absorbing means and the lower plate.

In the steering wheel according to the present invention, when a shock is applied in the direction perpendicular to the cover pad, the shock absorbing means is crushed or deformed in compression mode. However, when a shock is applied obliquely to the cover pad, since the shock absorbing member is bent into a shallow V-shape at the projection of the support base in shearing mode, it is possible to reduce the rigidity of the shock absorbing means to such an extent substantially the same as in the compression mode.

Further, it is preferable to additionally provide a second W-shaped cross-section shock absorbing plate extending in parallel to an axial direction of a first hollow cylindrical shock absorbing member in such a way that two longitudinal side ends thereof are connected to the upper and lower circumferential portions of the first hollow cylindrical shock absorbing member via the upper and lower plates. When the upper plate is formed with an opening, two flanges and two embosses, it is possible to adjustably increase or decrease the rigidity of the shock absorbing means in relation to the various dimensions (width, length, thickness, etc.) of the shock absorbing plate and the upper and lower plates, so that uniform shock absorbing characteristics can be obtained irrespective of points and directions at and in which a shock is applied.

BRIEF DESCRIPTION OF THE DRAWINGS

FIG. 12A is a side view for assistance in explaining a fourth embodiment of the support base according to the present invention;

FIG. 12B is a cross-sectional view taken along the line 12B—12B in FIG. 12A;

FIG. 18 a cross-sectional view, similar to FIG. 16C, for assistance in explaining a second embodiment of another shock absorbing member according to the present invention.

DETAILED DESCRIPTION OF THE PREFERRED EMBODIMENTS

Figure 1A:
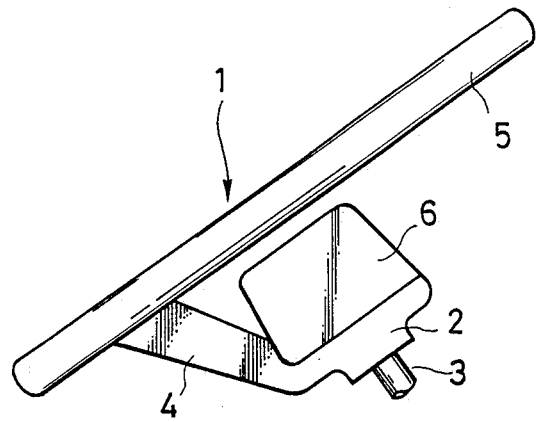
FIG. 1A is a side view showing an example of prior-art steering wheels provided with a shock absorber.
Figure 1B:
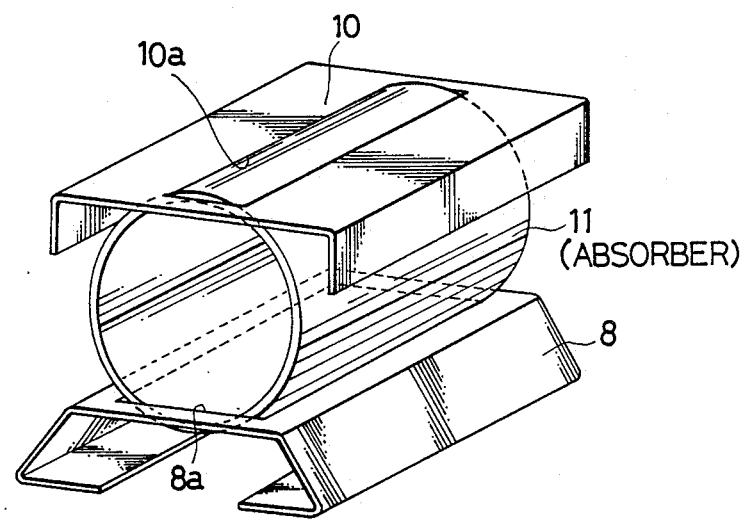
FIG. 1 is an enlarged perspective view showing a prior-art shock absorbing structure incorporated in the steering wheel shown in FIG.1A.
Figure 2:
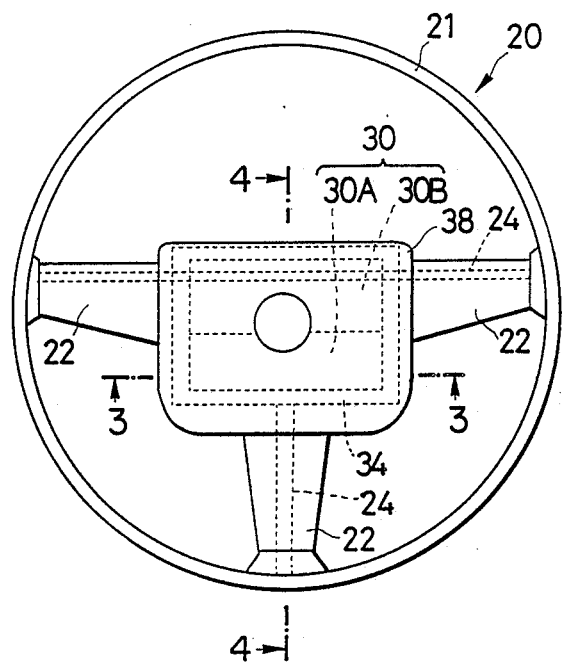
FIG. 2 is a plan view showing a steering wheel to which a shock absorber according to the present invention is applied.
Figure 3:
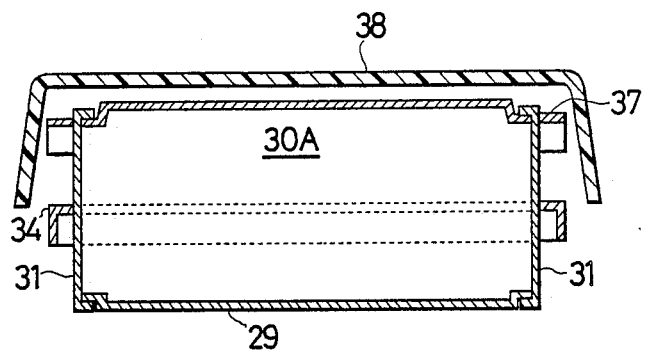
FIG. 3 is a cross-sectional view taken along the line 3—3 in FIG. 2.
Figure 4:
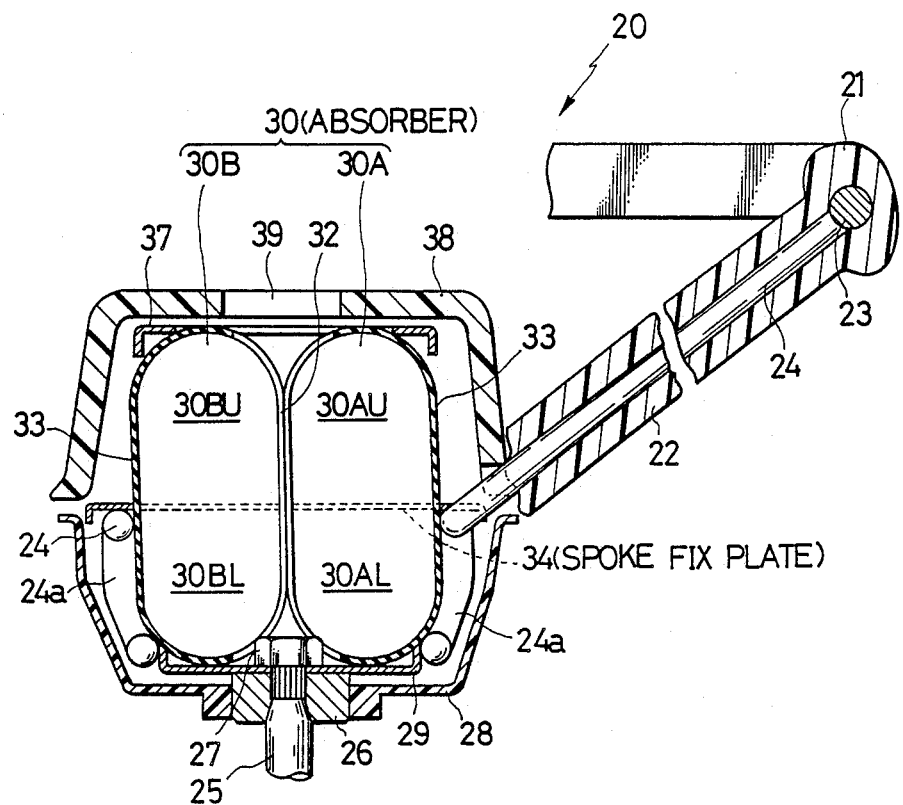
FIG. 4 is another cross-sectional view taken along the line 4—4 in FIG. 2, for assistance in explaining a first embodiment of the shock absorbing member according to the present invention.

A first embodiment of the shock absorbing member according to the present invention will be described hereinbelow with reference to FIGS. 2 to 5. In FIGS. 2, 3 and 4, the steering wheel 20 is composed of a rim 21, a cover pad 38, a lower cover 28 (shown in FIG. 4), three spokes 22 extending from the rim 21 to a space formed between the cover pad 38 and the lower cover 28. The rim 21 is reinforced by a circular core metal 23 (shown in FIG. 4), and the three spokes 22 are reinforced by two straight core metals 24. Further, a shock absorbing member 30 composed of first and second absorbing portions 30A and 30B made of hard rubber, for instance, is disposed at the center of the rim 21. In FIG. 3, the shock absorbing member 30 is supported or sandwiched between an upper (cover side) plate 37 and a lower (hub side) plate 29 in the vertical direction and between the two end surface lids 31 in the horizontal direction. Although not shown in detail, since a cutout portion is formed on the upper end of each end surface lid 31, the upper side plate 37 is movable up and down within the cutout portions of the two end surface lids 31.

Further, a spoke fixing plate 34 (connecting means for connecting the spokes 22 to the absorbing member 30) is fixed to the middle outer peripheral surface of the shock absorbing member 30.

The central portion of the steering wheel 20 will be explained in further detail with reference to FIG. 4. A hub 26 and the lower plate 29 are fixed to a top end of a steering shaft 25 with a nut 27. Further, a lower cover 28 is fixed to the outer circumference of the hub 26. The shock absorbing member 30 is a twin oval cross-section hollow cylindrical member including two portions 30A and 30B. Further, a hole 32 is formed at the center of the contact surface of the two portions 30A and 30B so that the nut 27 can be tightened or loosed from above through a central hole 39 formed in the cover pad 38.

A radially inner end of the core metal 24 of the spoke 22 is fixed to the spoke fixing plate 34 from radially outside. This spoke fixing plate 34 is fixed to the middle of the outer peripheral surface 33 of the shock absorbing member 30 after the absorbing member 30 has been passed through an inner cutout portion formed in the plate 34, as depicted in FIG. 4.

Further, two spoke extending portions 24a extending from the radially inner end of the spokes 24 in the downward direction are fixed to the lower outer peripheral surfaces of the two shock absorbing portions 30A and 30B to support the absorbing member 30 from outside and below.

Owing to the presence of the spoke fixing plate 34, the first shock absorbing 30A is divided in function into a first upper shock absorbing portion 30AU and a first lower shock absorbing portion 30AL; and the second shock absorbing portion 30B is divided in function into a second upper shock absorbing portion 30BU and a second lower shock absorbing member 30BL.

Figure 5A:
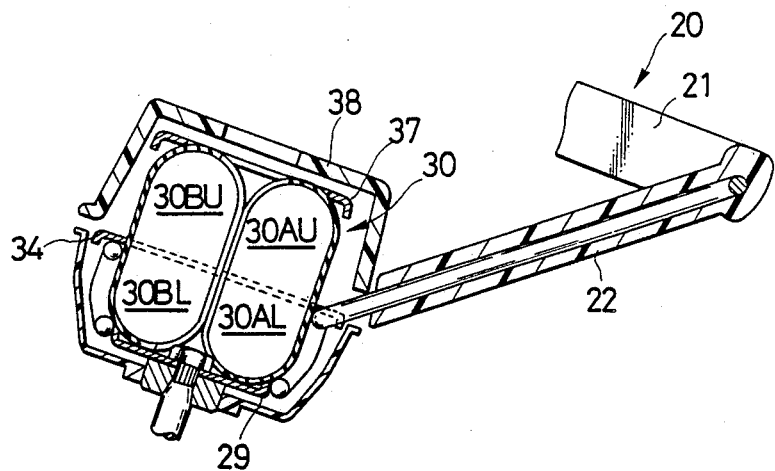
FIGS. 5A and 5B are cross-sectional views similar to FIG. 4, for assistance in explaining the shock absorbing effect of the first embodiment.
Figure 5B:
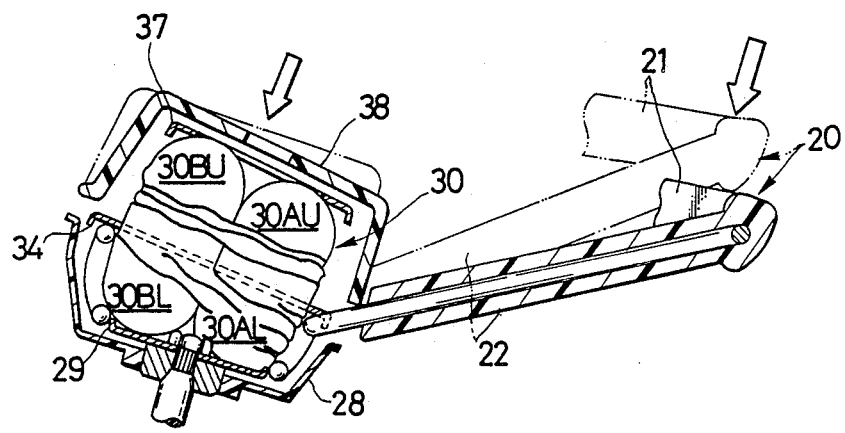

The function of the shock absorber of the steering wheel according to the present invention will be described with reference to FIGS. 5A and 5B, in which FIG. 5A shows the normal position where no shock is applied to the steering wheel, and FIG. 5B shows the abnormal position where shocks are applied to the steering wheel.

When the vehicle collides with something and therefore the driver strikes his breast against the rim 21 of the steering wheel 20 due to the inertia thereof, the shock energy is transmitted from the spokes 22, through the spoke fixing plate 34, to the first and second lower shock absorbing portions 30AL and 30BL. Since these lower portions 30AL and 30BL are deformed by a sheering force generated between the spoke fixing plate 34 and the lower plate 29, the steering wheel 20 is moved to absorb a shock energy from a position shown by dot-dot-dashed lines to that shown by solid lines in FIG. 5B. In this case, since the rim 21 is rotated clockwise in FIG. 5B, it is possible to increase the contact area of the driver's breast with the rim 21, so that it is possible to reduce pressure applied from the rim 21 to the driver's breast.

On the other hand, when the driver strikes his head against the cover pad 38, the shock energy is transmitted from the cover pad 38, through the upper plate 37, to the first and second upper shock absorbing portions 30AU and 30BU. Since these upper portions 30AU and 30BU are deformed by a compressive force generated between the upper plate 37 and the spoke fixing plate 34, the cover pad 38 is moved to absorb a shock energy from a position shown by dot-dot-dashed line to that shown by solid lines in FIG. 5B.

Here, it should be noted that since a single shock absorbing member 30 composed of two first and second portions 30A and 30B is divided in function by the spoke fixing member 34 into the upper shock absorbing portion 30AU and 30BU and the lower shock absorbing portion 30AL and 30BL, it is possible to simultaneously absorb two shocks applied from the driver's breast to the rim 21 and also from the driver's head to the cover pad 38 by the same single shock absorbing member 30, thus simplifying the absorber construction.

Further, in this embodiment, since the upper plate 37 is made of metal and the shock absorbing member 30 is made of hard rubber, the rigidity of the upper plate 37 is greater than that of the shock absorbing member 30. Therefore, it is possible to effectively deform the shock absorbing member 30 without deforming the upper plate 37, irrespective of the position, the area, and direction of shock applied onto the cover pad 38.

Figure 6:
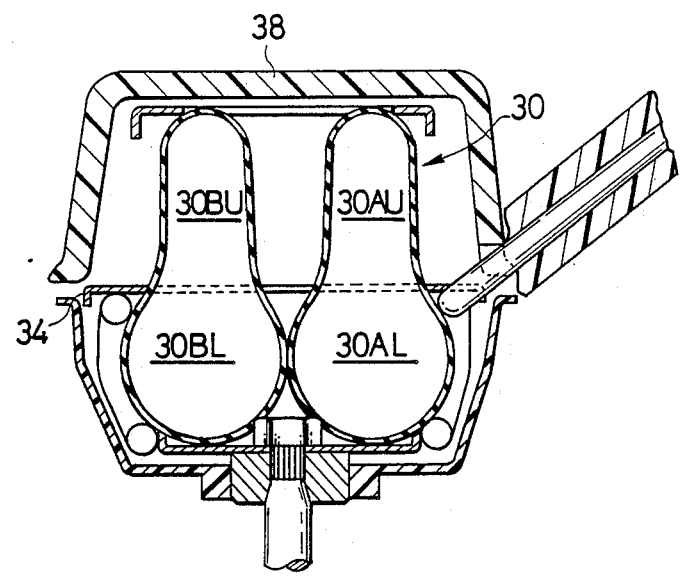
FIG. 6 is a similar cross-sectional view for assistance in explaining a second embodiment of the shock absorbing member according to the present invention.

FIG. 6 shows a second embodiment of the present invention, in which the shock absorbing member 30 is a twin gourd-shaped cross-section hollow cylindrical member. Therefore, the elasticity or the rigidity of the two shock absorbing portions 30A and 30B is different between the upper and lower portions with the spoke fixing plate 34 as the boundary. That is, the cross section of the shock absorbing portion 30A or 30B is oval in the upper portion but circle in the lower portion. Therefore, in this embodiment, the rigidity of the lower portion 30AL or 30BL of the shock absorbing portion 30A or 30B is lower than that of the upper portion 30AU or 30AL thereof, so that it is possible to more effectively absorb a shock applied to the rim, as compared with a shock applied to the cover pad 38. In this embodiment, there exists such an advantage that the spoke fixing plate 34 can securely deform the lower portions 30AL and 30BL of the shock absorbing portions 30A and 30B even if the plate 34 is removed from the middle outer peripheral surface of the absorbing member 30.

Figure 7:
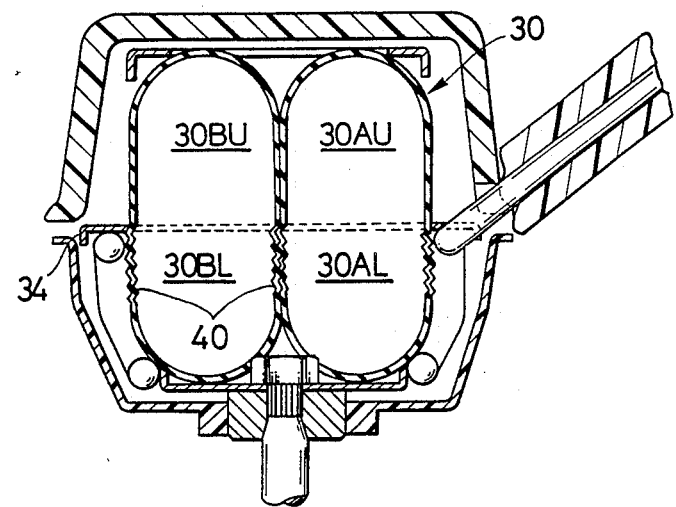
FIG. 7 is a similar cross-sectional view for assistance in explaining a third embodiment of the shock absorbing member according to the present invention.

FIG. 7 shows a third embodiment, in which bellows 40 is formed in the lower portion 30AL or 30BL of the shock absorbing portion 30A or 30B in order to reduce the rigidity of the lower portion thereof.

In the above-mentioned embodiments, the shock absorbing member 30 is composed of two hollow cylindrical members whose cross-section is oval, circular or gourd-shaped and made of a hard rubber. Without being limited thereto, however, it is possible to form the shock absorbing member 30 by a single hollow or solid cylindrical member. Further, the material of the shock absorbing member can be selected freely, under due consideration of the shape of the shock absorbing member and the rigidity of the material, from various materials such as synthetic resin, rubber, metal, etc., without being limited to only hard rubber.

As described above, in the steering wheel according to the present invention, since a shock absorbing member is disposed under the cover pad and effectively fixed to the spoke fixing plate at roughly the middle outer peripheral surface thereof, a shock applied to the rim can be absorbed by shearing deformation of the lower portion of the shock absorbing member and simultaneously a shock applied to the cover pad can be absorbed by compressive deformation of the upper portion of the shock absorbing member. Therefore, two shocks applied to two different positions of the steering wheel can be absorbed effectively in spite of a simple shock absorber construction without increasing the number of parts. Further, since the shock absorbing member is connected to the rim uniformly via two or three spokes, it is possible to stably absorb shock applied to the rim in various directions. Further, since the rigidity of the shock absorbing member can be freely adjusted on the upper and lower sides, it is possible to effectively absorb shock applied to the rim, in particular.

A first embodiment of a support base according to the present invention will be described hereinbelow with reference to FIGS. 8 and 9.

A steering wheel 112 is provided with a circular rim 113 and two spokes 114 one end of each of which is fixed to the rim 113. On the other hand, a hub 116 is fitted to an end of a steering shaft 115 and fastened with a nut 117. Further, the other end of each of the two spokes 114 is fixed by welding to the outer periphery of the hub 116. A cover pad 118 is disposed so as to cover the spokes 114 and the hub 116, and a lower cover 130 is fixed to the hub 116.

Figure 8A:
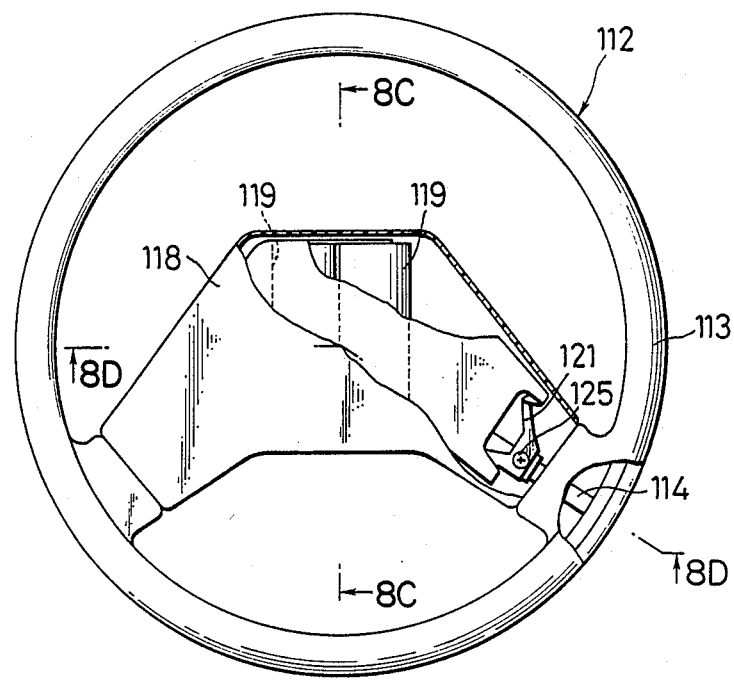
FIG. 8A is a partially broken top view showing a steering wheel to which a support base according to the present invention is applied.
Figure 8B:
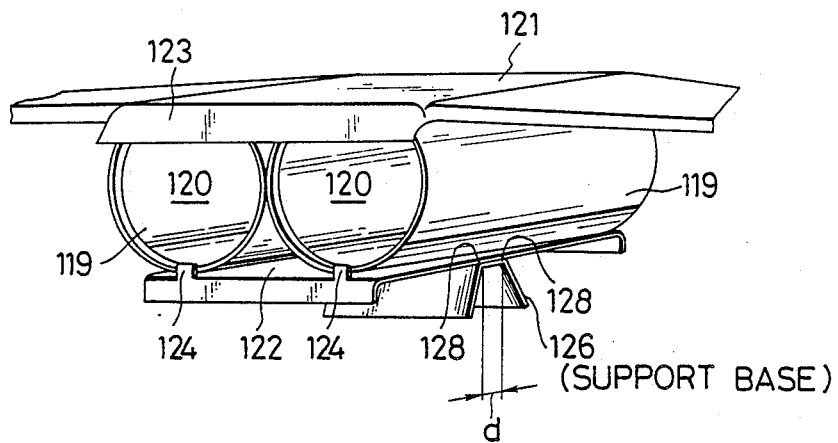
FIG. 8B is a perspective view for assistance in explaining a first embodiment of the support base according the present invention.
Figure 8C:
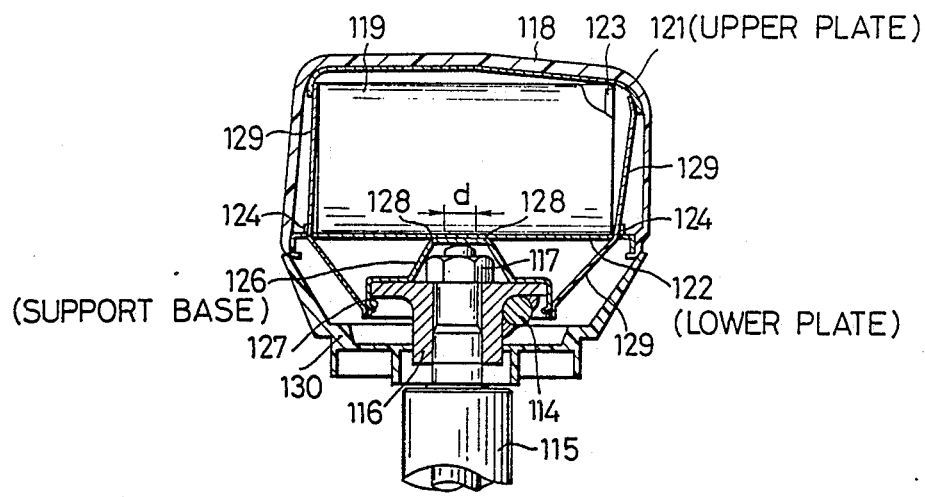
FIG. 8C is a cross-sectional view taken along the line 8C—8C in FIG 8A.
Figure 8D:
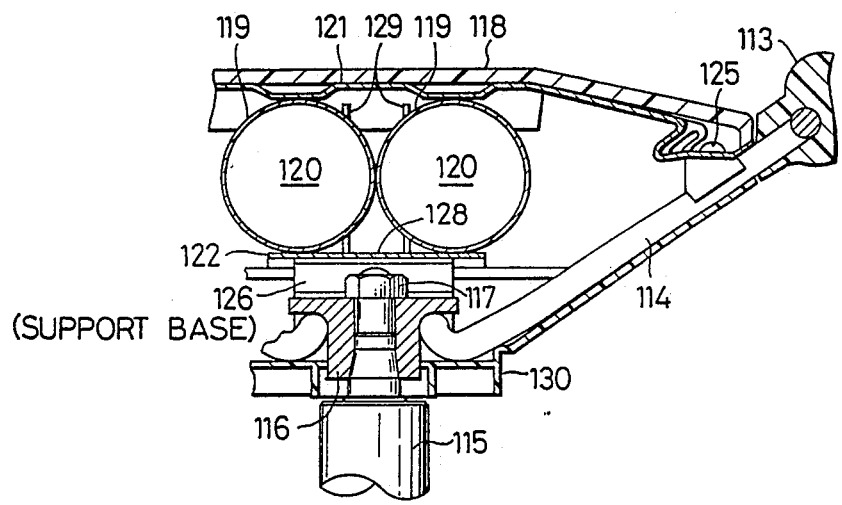
FIG. 8D is a cross-sectional view taken along the line 8D—8D in FIG 8A.

Two parallel arranged cylindrical metallic shock absorbing members 119 are arranged under the cover pad 118 in such a way that the axial direction thereof is directed to the vehicle longitudinal direction. The two shock absorbing members 119 are closed by four lids 120 at both ends thereof and sandwiched by an upper plate (cover side plate) 121 and a lower plate (hub side plate) 122. As shown in FIG 8B, the two shock absorbing members 119 are arranged between the upper and lower plates 121 and 122 in a contact positional relationship with respect to each outer circumferential surface of each shock absorbing member 119. The upper plate 121 is formed with claw portions 123 and the lower plate 122 is formed with other claw portions 124 to hold the absorbing members 119 so that the members 119 will not be slid in the axial direction thereof. A radially outermost end of the upper plate 121 is fixed to the spoke 114 with a screw 125, as shown in FIGS. 8A and 8D to prevent the upper plate 121 from being removed at collision. On the other hand, the cover pad 118 is engaged with the side edges of the lower plate 122, as shown in FIG. 8C.

One feature of the present invention is to provide a support base 126 on the hub 116. The support base 126 of the first embodiment shown in FIG. 8C is formed with a trapezoidal cross-section projection whose longitudinal direction is arranged perpendicular to the axial direction of the absorbing members 119 and two spring hook portions 127 engageable with the outer periphery of the hub 116. A pair of edge portions 128 are formed at an interval d on the upper surface of the support base 126 and fixed to the lower plate 122 by welding, as shown in FIG. 8B. Four vertical plates 129 are disposed to prevent the cylindrical absorbing member 119 from being rotated when a shock is applied to the members 119. Each upper end of these plates 129 is welded to the upper plate 121 and each lower end thereof is welded to the side surface of the support base 126 after having passed through a cutout portion formed in the lower plate 122, as shown in FIGS. 8C and 8D.

Figure 9A:
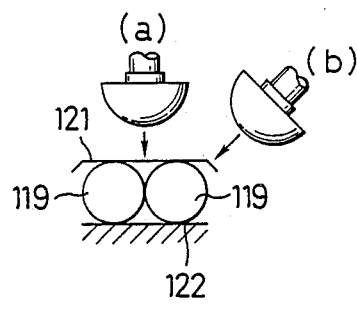
FIG. 9A is a view showing first and second directions (a) and (b) that a shock is applied to the shock absorber.
Figure 9B:
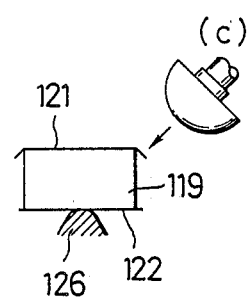
FIG. 9B is a view showing a third direction (c) that a shock is a applied to the shock absorber.
Figure 9C:
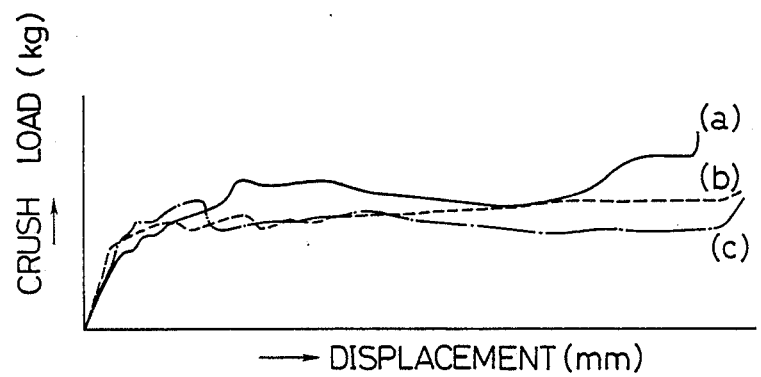
FIG. 9C is a graphical representation showing the relationship between the displacement and the crush load of the shock absorber obtained when a shock is applied to the shock absorber in three different directions.

In the construction as described above, when a shock is applied to the upper plate 121 in the direction perpendicular thereto as shown by (a) in FIG. 9A, the shock absorbing members 119 are deformed or crushed in compression mode uniformly along the axial direction of the steering shaft 115. When a shock is applied to the upper plate 121 in the direction obliquely from the vehicle transversal direction as shown by (b) in FIG. 9A, the shock absorbing member 119 is also deformed or crushed in sheering mode obliquely to the axial direction of the steering shaft 115. Further, when a shock is applied to the upper plate 121 in the direction obliquely from the vehicle longitudinal direction as shown by (C) in FIG. 9B, since the absorbing members 119 are bent into a shallow V-shape by the projection of the support base 126, it is possible to sufficiently reduce the rigidity of the absorbing members 119 as compared with when the top surface of the support base 126 is broad. FIG. 9C shows the relationship between the displacement and the crush load of the shock absorbing members 119, in which the solid curve corresponds to the first direction shown by (a) in FIG. 9A; the dashed curve corresponds to the second direction shown by (b) in FIG. 9A; and the dot-dashed curve corresponds to the third direction shown by (c) in FIG. 9(B).

As described above, when the diameter of the cylindrical absorbing members 119 and the distance d between the two edge portions 128 are appropriately determined, it is possible to make the crush load of the absorbing members 119 along the three different directions as close as possible, that is, to make uniform the shock absorbing characteristics under various conditions, so that it is possible to effectively absorb shock applied to the cover pad 118 at various different positions and in various different directions, that is, to eliminate the directivity of the shock absorbing characteristics of the shock absorbing members 119.

Figure 10A:
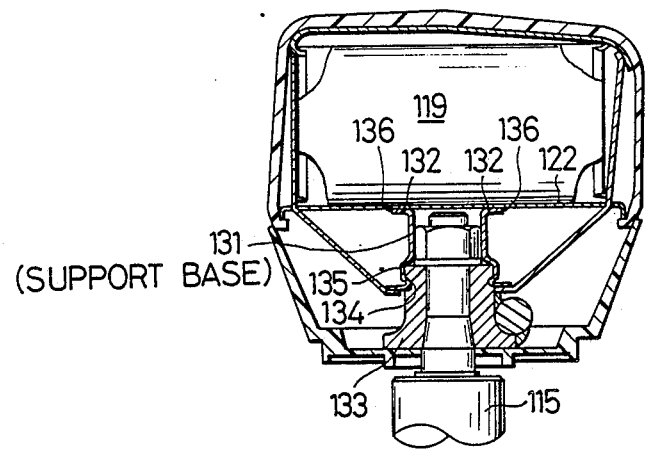
FIG. 10A is a cross-sectional view similar to FIG. 8C, for assistance in explaining a second embodiment of the support base to the present invention.
Figure 10B:
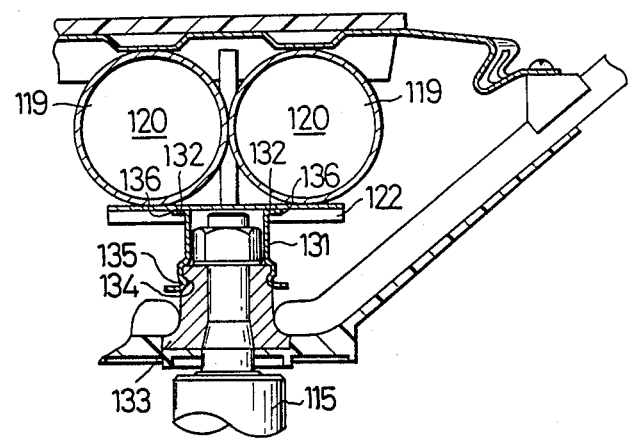
FIG. 10B is a cross-sectional view, similar to FIG. 8D, for assistance in explaining the second embodiment of the support base.
Figure 10C:
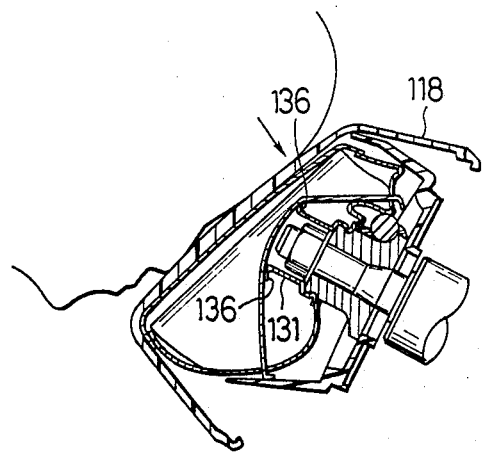
FIG. 10C is a cross-sectional view for assistance in explaining the deformation or the crush of the shock absorber of the second embodiment obtained when the driver strikes his head against the cover pad.

FIGS. 10A, 10B and 10C show a second embodiment of the support base according to the present invention. In this embodiment, the support base 131 is a hollow cylindrical member formed with an upper flange portion 132 on the upper side thereof and a spring hook portion 135 on the lower side thereof. The flange portion 132 is welded to the lower plate 122 and the spring hook portion 135 is engaged with a circular groove 134 formed on the outer circumference of a boss 133 fitted to the steering shaft 115.

Therefore, when the driver strikes his head against the cover pad 118, the shock absorbing members 119 are bent or deformed at two edges 136 as shown in FIG. 10C, so that it is possible to obtain shock absorbing characteristics free from the directivity.

Figure 11:
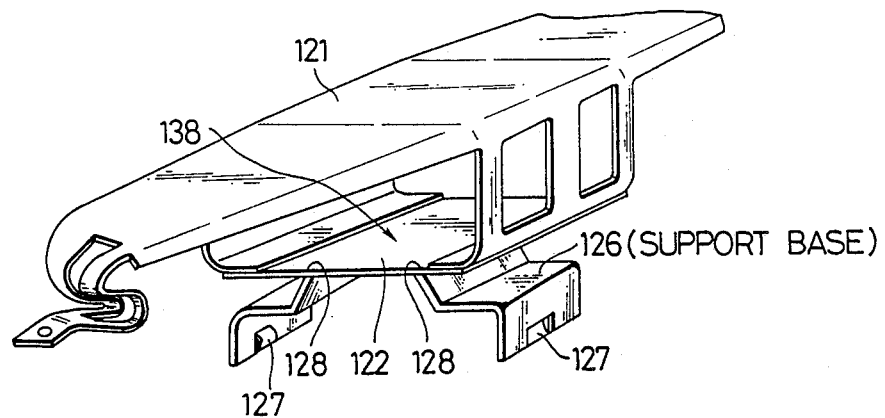
FIG. 11 is a perspective view for assistance in explaining a third embodiment of the support base according to the present invention.

FIG. 11 shows a third embodiment of the support base according to the present invention. In this embodiment, the upper plate 121 and the lower plate 122 are formed integral as a rectangular cross-section cylindrical member 138. Further, a trapezoidal cross section support base 126 is welded to the lower plate 122 as shown in FIG. 11. Therefore, when the driver strikes his head against the cover pad, the lower plate 122 is bent at the two edges 128. Further, the support base 126 is formed with two hook portions 127 engaged with two recesses (not shown) formed in the hub or the boss (both not shown).

FIGS. 12A and 12B show a fourth embodiment of the support base. In this embodiment, the hub 137 is used in common as a support base 137. That is, the hub serving as the support base 137 is fastened to the steering shaft 115 together with the lower plate 122 with the nut 117. The two shock absorbing members 119 are bent at the circumferential edge 128. As shown in FIG. 12B, the two shock absorbing members 119 are arranged in parallel with one another and are arranged between upper plate 121 and lower plate 122 in spaced positional relationship with respect to each outer circumferential surface of each shock absorbing member 119.

Figure 13A:
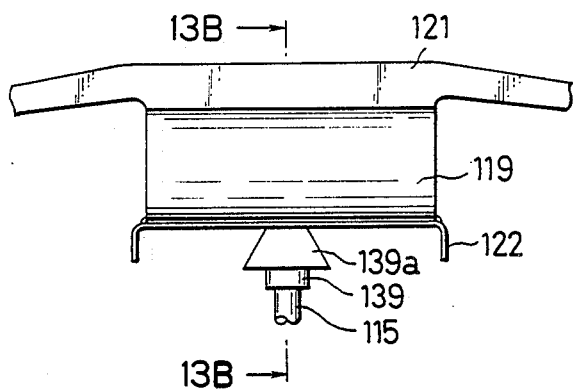
FIG. 13A is a side view for assistance in explaining a fifth embodiment of the support base according to the present invention.
Figure 13B:
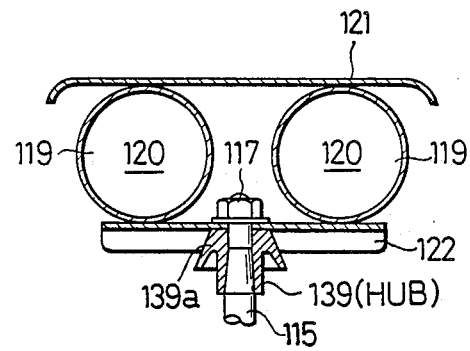
FIG. 13B a cross-sectional view taken along the line 13B—13B in FIG. 13A.

FIGS. 13A and 13B show a fifth embodiment of the support base, in which a hub 139 is formed with a conical cross-section head 139a.

Figure 14:
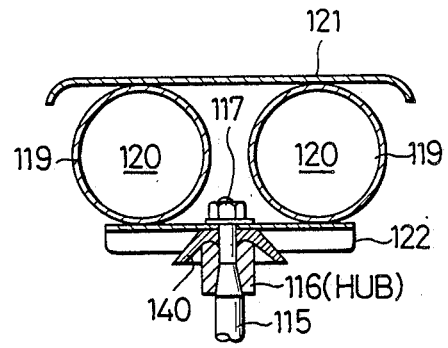
FIG. 14 a cross-sectional view for assistance in explaining a sixth embodiment of the support base according to the present invention.

FIG. 14 shows a sixth embodiment of the support base, in which the hub with the conical head is divided into a cylindrical hub member 116 and a conical collar member 140. In this embodiment, the hub is first fitted to the steering shaft 115, and the conical collar member 140 and the lower plate 122 are fixed to the shaft 115 with the nut 117. As shown in FIG. 14, the two shock absorbing members 119 are arranged in parallel with one another and are arranged between upper plate 121 and lower plate 122 in spaced positional relationship with respect to each outer circumferential surface of each shock absorbing member 119.

In the description of the support base according to the present invention, the support base has been explained of the case where two cylindrical shock absorbing members 119 are used. Without being limited thereto, however, the support base according to the present invention is applicable to the embodiment where two shock absorbing members 30 as shown in FIGS. 4, 6 and 7 are incorporated.

Figure 15:
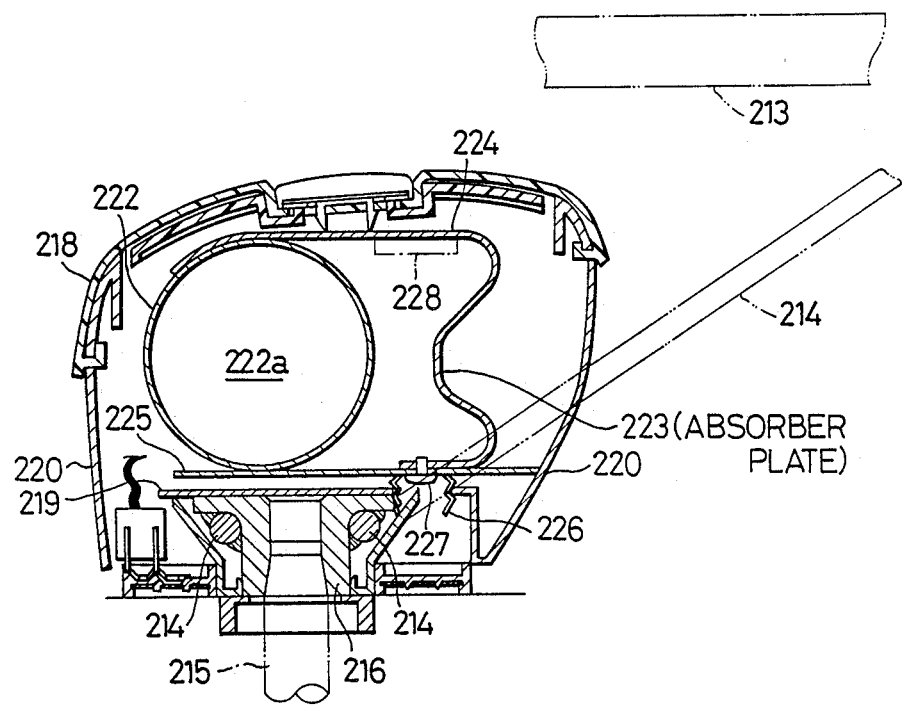
FIG. 15 is a cross-sectional view, similar to FIGS. 4, 8D, and 10B, showing a steering wheel to which another shock absorbing member according to the present invention is applied.

A first embodiment of the additional shock absorbing plate according to the present invention will be described hereinbelow with reference to FIGS. 15 to 17.

A steering wheel is provided with a circular rim 213 and two spokes 214 one end of each of which is fixed to the rim 213. A hub 216 is fitted to an end of a steering shaft 215 and fixed by a nut (not shown). Further, the other end of each of the two spokes 214 is fixed by welding to the outer periphery of the hub 216. A cover pad 218 is disposed so as to cover the spokes 214 and the hub 216. That is, the cover pad 218 is engaged with the upper opening portion of a pad support member 220 including a horizontal plate 219 fixed to the hub 216.

A cylindrical metallic shock absorbing member 222 is arranged under the cover pad 218 and closed by two lids 222a at both ends thereof. Further, a W-shaped cross-section shock absorbing plate 223 is arranged extending in parallel to the axial direction of the shock absorbing member 222 so as to cover the cylindrical shock absorbing member 222.

An upper plate 224 formed integral with the W-shaped shock absorbing plate 223 is fixed by welding to the upper circumference of the cylindrical shock absorbing member 222, and a lower plate 225 fixed to the W-shaped shock absorbing plate 223 with a screw 227 is fixed by welding to the lower circumference of the cylindrical shock absorbing member 222. Further, the lower plate 225 is engaged with a hole formed in the horizontal plate 219 of the pad support member 220 via a clip member 226.

Figure 16A:
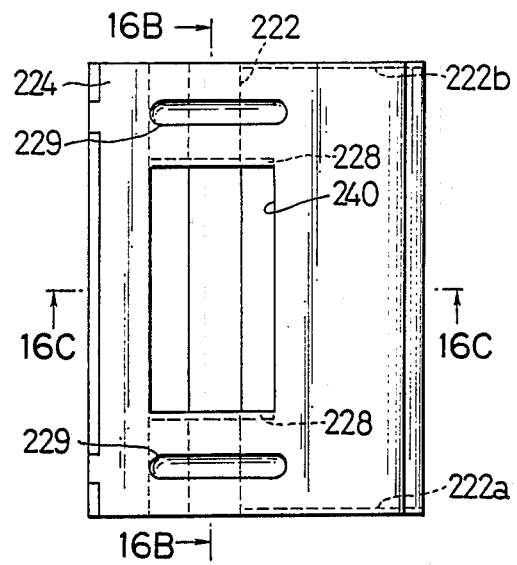
FIG. 16A is top view for assistance in explaining a first embodiment of another shock absorbing member according to the present invention.
Figure 16B:
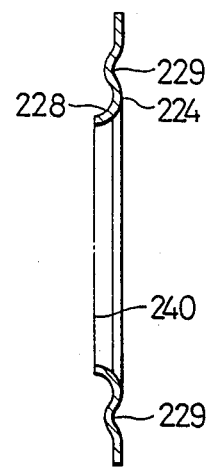
FIG. 16B is a cross-sectional view taken along the line 16B—16B in FIG. 16A.
Figure 16C:
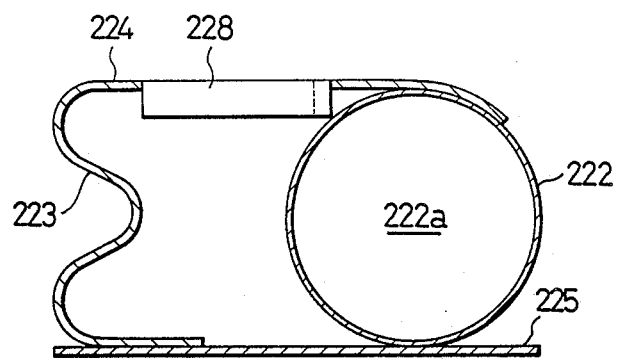
FIG. 16C is a cross-sectional view taken along the line 17C—17C in FIG. 16A.

As shown in FIGS. 16A, 16B and 16C, the upper plate 224 of the W-shaped shock absorbing plate 223 is formed with a rectangular opening 240 having two side flanges 228 and two embossed portions 229 in parallel to the side flanges 228, respectively, in order to obtain uniform shock absorbing characteristics irrespective of the points and the directions at and in which a shock is applied. The opening 240 serves to decrease the rigidity of the two shock absorbing members 222 and 223 in combination, and the flanges 228 and the embosses 229 serve to increase the rigidity of the two shock absorbing members 222 and 223. Therefore, the shock absorbing characteristics can be determined by various dimensions of the length, width, thickness, curvatures of the W-shaped cross-section, opening, flanges, embosses, etc. of the W-shaped absorbing plate 223, as well as the dimensions of the cylindrical shock absorbing member 222.

In this embodiment, when the driver strikes his head against the cover pad 218, the shock is mainly absorbed by the cylindrical shock absorbing member 222 and the W-shaped cross-section shock absorbing member 223 without largely deforming the upper and lower plates 224 and 225.

Figure 17A:
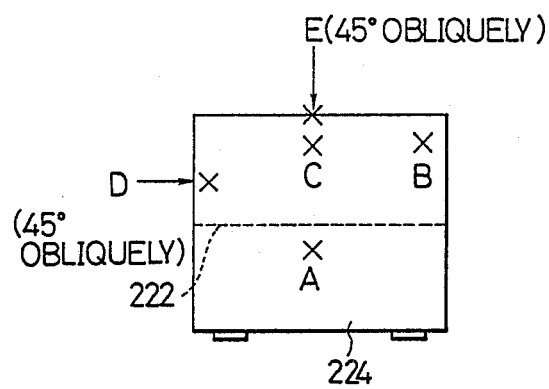
FIG. 17A and 17B are views showing various directions (A) to (E) that a shock is applied to the shock absorber.
Figure 17B:
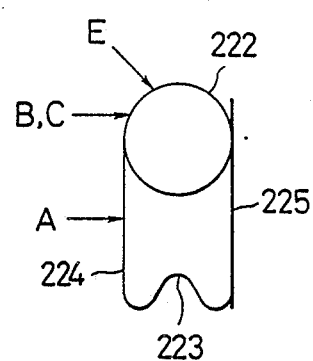
Figure 17C:
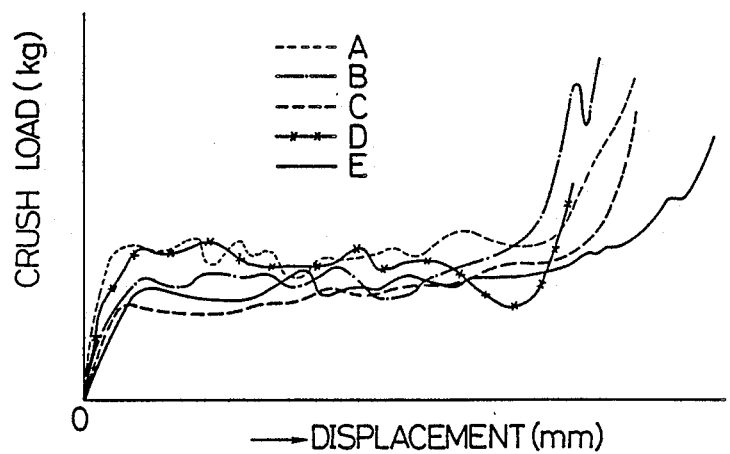
FIG. 17C is a graphical representation showing the relationship between the displacement and the crush load of the shock absorber obtained when a shock is applied to the shock absorber in various different directions (A) to (E)

In the construction as described above, when a shock is applied to the upper plate 224 at the various positions perpendicular thereto (A, B and C) or obliquely thereto (D and E), as shown in FIGS. 17A and 17B, it is possible to obtain the relatively uniform relationship between the displacement and the crush load of the absorbing member as shown in FIG. 17C.

FIG. 17C indicates that the shock absorbing characteristics or the rigidity of the shock absorbing members 222 and 223 is not subjected to the influence of the positions and directions at and in which a shock is applied, without providing the directivity of the shock absorber.

FIG. 18 shows a second embodiment of the additional shock absorbing plate according to the present invention, in which the lower plate 225 is formed with two stoppers 230 welded to the lower periphery of the absorbing member 222 in order to prevent the cylindrical shock absorbing member 222 from being rotated, when a strong shock is applied to the member 222 in the direction E, for instance.

In the description of the additional shock absorbing plate according to the present invention, the additional W-shaped shock absorbing plate has been explained of the case where a single cylindrical shock absorbing member 222 is assembled. Without being limited thereto, however, the additional W-shaped shock absorbing plate according to the present invention is applicable to the embodiment where two shock absorbing members 30 as shown in FIGS. 4, 6 and 7 are incorporated.

As described above, in the steering wheel according to the present invention, since the support base disposed under the lower plate (on which the shock absorbing member is arranged) is formed with a projection for supporting the lower plate at a smaller area, when a shock is applied to the cover pad obliquely, the shock absorbing member can be bent into a shallow V-shaped in shearing mode by the projection, so that the rigidity of the shock absorbing member can be reduced to such an extent substantially the same as in the compression mode; that is, it is possible to obtain uniform shock absorbing characteristics irrespective of positions and directions at and in which a shock is applied.

Further, when the additional shock absorbing plate is further provided, it is possible to more freely adjust the rigidity of the shock absorber in relation to various dimensions of the shock absorbing plate and the upper and lower plates, in order that uniform shock absorbing characteristics can be obtained against shocks applied to the cover pad at various points and in various directions.

What is claimed is:

1. A steering wheel provided with a shock absorber, comprising:

(a) a steering wheel including a rim, a cover pad, and at least one spoke extending from said rim to under said cover pad;

(b) shock absorbing means disposed under said cover pad; and (c) connecting means for connecting a radially inner end of said spoke to a roughly middle peripheral surface of said shock absorbing means so as to divide said shock absorbing means into a lower shock absorbing portion for mainly absorbing a shock applied to said rim in dependence upon shearing deformation thereof and an upper shock absorbing portion for mainly absorbing a shock applied to said cover pad in dependence upon compressive deformation thereof.

2. The steering wheel provided with a shock absorber of claim 1, wherein rigidity of said shock absorbing means is different between the lower and upper shock absorbing portions.

3. The steering wheel provided with a shock absorber of claim 2, wherein rigidity of the lower shock absorbing portion is determined lower than that of the upper shock absorbing portion to effectively absorb a shock applied to said rim.

4. The steering wheel provided with a shock absorber of claim 1, wherein said shock absorbing means is a twin oval cross-section hollow cylindrical member.

5. The steering wheel provided with a shock absorber of claim 4, wherein said twin oval cross-section hollow cylindrical member is formed with bellows on the lower shock absorbing portion thereof.

6. The steering wheel provided with a shock absorber of claim 1, wherein said shock absorbing means is a twin gourd-shaped cross-section hollow cylindrical member.

7. The steering wheel provided with a shock absorber of claim 1, wherein said shock absorbing means is made of a hard rubber.

8. The steering wheel provided with a shock absorber of claim 1, wherein said shock absorbing means is made of a metal.

9. The steering wheel provided with a shock absorber of claim 1, wherein said connecting means is a spoke fixing plate formed with an inner cutout portion through which said shock absorbing means is passed to fix said spoke fixing plate to the middle outer peripheral surface of said shock absorbing means, the radially inner end of said spoke being fixed to said spoke fixing plate from outside.

10. The steering wheel provided with a shock absorber of claim 9, wherein said spoke includes an extending portion for supporting the lower shock absorbing portion of said shock absorbing means from outside and below.

11. The steering wheel provided with a shock absorber of claim 1, which further comprises:

(a) an upper plate attached to an upper end surface of said shock absorbing means; and (b) a lower plate attached to a lower end surface of said shock absorbing means, for sandwiching said shock absorbing means in cooperation with said upper plate.

12. The steering wheel provided with a shock absorber of claim 11, which further comprises a support base having a projection to be fixed to said lower plate, for supporting said lower plate at a smaller area so as to reduce the rigidity of said shock absorbing means and said lower plate.

13. The steering wheel provided with a shock absorber of claim 12, wherein the projection of said support base is a trapezoidal cross-section projection extending perpendicular to an axial direction of said shock absorbing means.

14. The steering wheel provided with a shock absorber of claim 12, wherein the projection of said support base is a cylindrical projection formed with a flange to be fixed to said lower plate.

15. The steering wheel provided with a shock absorber of claim 12, wherein the projection of said support base is a trapezoidal cross-section projection extending perpendicular to an axial direction of said shock absorbing means supported between said upper and lower plates formed integral with each other.

16. The steering wheel provided with a shock absorber of claim 12, wherein said support base is a cylindrical hub fixed to a steering shaft together with said lower plate.

17. The steering wheel provided with a shock absorber of claim 16, wherein said cylindrical hub is formed with a conical cross-section head fixed to said lower plate.

18. The steering wheel provided with a shock absorber of claim 17, wherein said conical cross-section head is a separate member sandwiched between said lower plate and said cylindrical hub.

19. The steering wheel provided with a shock absorber of claim 11, wherein said shock abosorbing means comprises:

(a) a first hollow cylindrical shock absorbing member; and (b) a second curved cross-section shock absorbing plate extending in parallel to an axial direction of said first hollow cylindrical shock absorbing member, two longitudinal side ends thereof being connected to upper and lower circumferential portions of said first hollow cylindrical shock absorbing member via said upper and lower plates, for providing uniform shock absorbing characteristics irrespective of points and directions at and in which a shock is applied.

20. The steering wheel provided with a shock absorber of claim 19, wherein said second shock abosorbing plate is a W-shaped cross-section shock absorbing plate.

21. The steering wheel provided with a shock absorber of claim 19, wherein said upper plate is formed with an opening, a flange and an emboss to adjustably increase and decrease rigidity of said shock absorbing means for providing uniform shock absorbing characteristics irrespective of points and directions at and in which a shock is applied.

22. The steering wheel provided with a shock absorber of claim 19, wherein said lower plate is formed with two stoppers for supporting said first hollow cylindrical shock absorbing member to prevent said first shock absorbing member from being rotated when a shock is applied to the first shock absorbing member obliquely.

23. The steering wheel provided with a shock absorber of claim 11, wherein said shock absorber means comprises:

(a) a first hollow cylindrical shock absorbing member; and (b) a second hollow cylindrical shock absorbing member arranged in parallel to said first hollow cylindrical shock absorbing member, said first and second hollow cylindrical shock absorbing members being sandwiched between said upper and lower plates with two axial directions of said two absorbing members arranged in parallel to the surfaces of said two upper and lower plates, for providing uniform shock absorbing characteristics irrespective of points and directions at and in which a shock is applied.

24. The steering wheel provided with a shock absorber of claim 23, wherein said first and second hollow cylindrical shock absorbing members are arranged between said two upper and lower plates in contact positional relationship with respect to each outer circumferential surface of each cylindrical shock absorbing member.

25. The steering wheel provided with a shock absorber of claim 23, wherein said first and second hollow cylindrical shock absorbing members are arranged between said two upper and lower plates in spaced positional relationship with respect to each outer circumferential surface of each cylindrical shock absorbing member.

26. A steering wheel provided with a shock absorber, comprising:
   (a) a steering wheel including a rim, a cover pad, and at least one spoke extending from said rim to a hub fixed to a steering shaft;
   (b) a first hollow cylindrical shock absorbing member;
   (c) a second curved cross-section shock absorbing plate extending in parallel to an axial direction of said first hollow cylindrical shock absorbing member; and
   (d) upper and lower plates for connecting upper and lower circumferential portions of said first hollow cylindrical shock absorbing member to two longitudinal side ends of said second curved cross-section shock absorbing plate, for providing uniform shock absorbing characteristics irrespective of points and directions at and in which a shock is applied.

* * * * *